United States Patent Office 3,280,071
Patented Oct. 18, 1966

3,280,071
SILICONE ELASTOMERS
Henry Nelson Beck, Midland, Mich., assignor to Dow Corning Corporation, Midland, Mich., a corporation of Michigan
No Drawing. Filed Mar. 13, 1963, Ser. No. 264,782
7 Claims. (Cl. 260—46.5)

This invention relates to a new type of silicone elastomer. More specifically, this invention relates to a silicone elastomer and the copolymer comprised of diorganopolysiloxane and monoorganopolysiloxane units from which the elastomer is made.

Organosilicon elastomers have been made from essentially diorganopolysiloxanes, or from essentially diorganopolysiloxanes wherein a portion of the siloxane oxygen atoms are replaced with divalent organic radicals. The distinguishing feature of these polymers that go into silicone elastomers is that essentially all of the silicon atoms thereof are difunctional; stated another way, the average degree of functionality of the said polymers is very nearly two. The said functionality is often limited to from 1.95 to 2.05 and occasionally even more restricted to such as 1.98 to 2.02. Degree of substitution (d.s.), rather than degree of functionality, is the usual nomenclature applied when discussing organosilicon compounds, whether monomers or polymers. The two are related in that the sum of the two is four. Thus, prior art organosilicon polymers having a degree of substitution significantly different from 2.0 (i.e., below about 1.95 or above about 2.05) have been considered to be, and by prior methods of preparing polymers were indeed, unsatisfactory for preparing elastomers therefrom.

In recently filed application Serial No. 210,235, filed July 16, 1962 (Polmanteer et al.), now abandoned, of which application Serial No. 377,526, filed June 24, 1964, is a continuation-in-part, there is described a new class of silicone elastomers. A distinguishing feature of this new class of elastomers is that the average degree of substitution of the polymers thereof is substantially less than two, ranging down to less than 1.5. Yet despite this very drastic deviation from the previously accepted requirement of d.s. near 2.0, the compositions cure to rubbery elastomers. In fact, these elastomers are unusually rubbery, displaying as well low hysteresis loss and extremely low fatigue rate. The above-identified application is hereby incorporated into this specification by reference.

A process of preparing the above-identified elastomers comprises copolymerizing block units of diorganopolysiloxane with block units of monoorganopolysiloxanes under conditions that do not produce gelation, but instead produce a composition which vulcanizes to a strong snappy elastomer.

One of the drawbacks connected with the elastomers made according to the above-identified application is their susceptibility to swelling when exposed to the common hydrocarbon fluids such as gasoline, naphtha, lubricating oils and other petroleum products. Another drawback is that the above said elastomers contain a substantial percentage of material found to be soluble in certain organic solvents, so that exposure of the elastomers by immersion in the said fluids causes the dissolution (leaching out) of the soluble portion therefrom. Such action is deleterious in that loss of part of the elastomeric product is sustained. End products made from such an elastomer undergo a net shrinkage when exposed as above and thereafter removed from the said fluid environment. These two drawbacks effectively preclude the use of the above-identified elastomers in or near to the said hydrocarbon fluids.

Diorganopolysiloxane elastomers having improved resistance to swelling in hydrocarbon fluids such as above result when some of the organo radicals of the said diorganopolysiloxane are fluorohydrocarbon radicals, such as β-(perfluoroalkyl)ethyl radicals. It has been found unexpectedly that the inclusion of the β-(perfluoroalkyl) ethyl radicals in the monoorganosiloxane portion of a diorganopolysiloxane - monoorganopolysiloxane block copolymer such as is described above not only improves the swelling resistance, but also drastically reduces the percentage of extractable material in the elastomer.

Accordingly, it is an object of the present invention to prepare new organosilicon elastomers. It is another object of this invention to prepare a silicone elastomer with superior fatigue properties. A further object is to prepare a silicone elastomer with superior elastomeric properties. Still another object is to prepare an unfilled silicone elastomer with improved strength. It is a primary object of this invention to accomplish the above objects with elastomers having improved swelling resistance and leaching resistance.

These objects and others that will be apparent are met by a process for preparing silicone rubber stock which comprises (A) mixing and heating in a suitable solvent at a temperature and for a time sufficient to produce a heat-curable rubber stock (1) 100 parts by weight of an organopolysiloxane which has an average of at least 200 silicon atoms per molecule, said siloxane consisting essentially of units of the formula

wherein R is selected from the group consisting of methyl, phenyl and vinyl radicals, $n$ has an average value of from 1.98 to 2.00 inclusive, there being an average of at least .75 methyl radical per silicon atom and an average of no more than .15 vinyl radical per silicon atoms in said siloxane, no more than 50 mol percent of said siloxane being $(C_6H_5)_2SiO$ units, said siloxane having an average of at least two silicon-bonded hydroxyl radicals per molecule, (2) from 40 to 175 parts by weight of an organosilicon compound of the unit formula

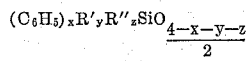

wherein R' is a monovalent hydrocarbon radical, R" is a β-(perfluoroalkyl)ethyl radical, $z$ has an average value of from 0.1 to 1.3 inclusive, $x$ has a maximum value of 1.2, $x+z$ has an average value of from .65 to 1.3 inclusive, $y$ has an average value of less than 0.4, $x+y+z$ has a value of from 0.85 to 1.3, at least 10 mol percent of said siloxane being $R''SiO_{1.5}$ units, at least 60 mol percent of said siloxane being the sum of $R''SiO_{1.5}$ and $(C_6H_5)SiO_{1.5}$ units, said siloxane containing an average of at least two radicals per molecule which are selected from the group consisting of hydroxyl and —OM radicals, wherein M is selected from the group consisting of alkali metal atoms, quaternary ammonium radicals, and quaternary phosphonium radicals, and (3) a catalytic amount of a silicon-bonded hydroxyl condensation catalyst, the concentration of solids in the solvent being such that no appreciable gelation occurs during the heating step, (B) and removing the solvent from the reaction product obtained in step (A), there being sufficient agitation during this step to keep the product substantially homogeneous.

The compositions prepared by the process of this invention are characterized by the fact that the two principal ingredients are preformed and then condensed under conditions which do not cause excessive siloxane bond rearrangement in (1). Thus, these compositions contain segments of

units coupled to (2). One of the critical features is that the blocks or segments of

must average at least 200 silicon atoms per block. Thus, when (1) is a dimethylsiloxane, the blocks have the formula

wherein $w$ has a value of at least 200. A representative empirical formula therefore of the compositions would be

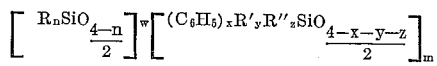

in which $w$ is at least 200 and $m$ is an integer and R, R', R'', $n$, $x$, $y$ and $z$ are as above defined.

It can be seen that the compositions of this invention are different from cohydrolyzates prepared by cohydrolyzing and co-condensing methylsilanes and phenylsilanes. Such copolymers have completely random structures which do not have the properties of the compositions of this invention.

One of the essential reactants of this process is an organosiloxane of the unit formula

wherein R is selected from the group consisting of methyl, phenyl and vinyl radicals. It is essential that there is an average of at least .75 methyl radical per silicon atom and an average of no more than .15 vinyl radical per silicon atom in this siloxane. Preferably all of the R groups are methyl. The subscript $n$ in this siloxane has an average value of from 1.98 to 2.00 inclusive. It is essential that this siloxane contain no more than 50 mol percent $(C_6H_5)_2SiO$ units. It is essential that this siloxane have an average of at least two hydroxyl radicals per molecule. It should be understood that siloxane (1) can also contain some residual reactive groups such as alkoxy groups which are often present in siloxanes. Such reactive groups can condense with SiOH or SiOM groups in (2) or they can react with water to generate SiOH groups in siloxane (1) in situ. Examples of such alkoxy radicals are methoxy, ethoxy, isopropoxy and butoxy. It is preferred that all of these radicals be hydroxy radicals. Although this siloxane can contain more than two of these radicals, it is preferred that the siloxane only contain an average of two hydroxyl radicals per molecule.

It is essential that (1) have an average of at least 200 silicon atoms per molecule. This is often referred to as average degree of polymerization. It is preferred that this siloxane have an average of from 300 to 3500 silicon atoms per molecule. The best results are obtained with a hydroxyl-endblocked dimethylsiloxane having an average degree of polymerization of from 300 to 3500. The hydroxyl-endblocked dimethylsiloxanes which contain from 5 to 10 mol percent $(C_6H_5)(CH_3)SiO$ units and a small amount of methylvinylsiloxane units (less than 5 mol percent) yield elastomers with excellent low temperature properties.

The above defined siloxane (1) is reacted with a mono-β-(perfluoroalkyl)ethyl-containing siloxane of the unit formula $$(C_6H_5)_xR'_yR''_zSiO_{\frac{4-x-y-z}{2}}$$

In the formula above R' is a monovalent hydrocarbon radical. Specific examples of monovalent hydrocarbon radicals which are operative in this invention are aliphatic radicals such as methyl, ethyl, butyl, octadecyl, vinyl, allyl, methallyl, butadienyl and propargyl; cycloaliphatic radicals such as cyclobutyl, cyclopentenyl and cyclohexadienyl; and monovalent hydrocarbon radicals containing aromatic nuclei such as xenyl, tolyl, benzyl and xylyl. Specific examples of R'' radicals β-(perfluoroalkyl)ethyl include such as 3,3,3-trifluoropropyl, 3,3,4,4,5,5,5-heptafluoropentyl, 2,2-bis(trifluoromethyl)ethyl, $$C_7F_{15}CH_2CH_2—$$

and $C_{10}F_{21}CH_2CH_2—$, the last two being either straight or branched chain. Siloxane (2) contains at least an average of 0.1 R'' radical per silicon atom. Preferably, there is at least an average of 0.25 R'' radical per silicon atom. In addition, the total of R'' plus phenyl radical-content of siloxane (2) averages at least 0.65 and not more than 1.3 per silicon atom. R' radicals can be present in up to an average of 0.4 per silicon atom. The sum of phenyl, R' and R'' radicals, should average from 0.85 to 1.3 per silicon atom. At least 60 percent of the siloxane units should be either $R''SiO_{1.5}$ or $(C_6H_5)SiO_{1.5}$ units, while the remainder can be $SiO_2$ units and such units as $R'SiO_{1.5}$, $R'_2SiO$, $(C_6H_5)R'SiO$, $R'R''SiO$, $(C_6H_5)R''SiO$ and $R''_2SiO$. In all cases the ratio of organic groups to silicon in this siloxane must fall within the defined range.

It is preferred that R' be an aliphatic hydrocarbon radical of from 1 to 6 inclusive carbon atoms. Preferably R' is vinyl. Preferably R'' is 3,3,3 - trifluoropropyl. Preferably siloxane (2) has an average of from 0.9 to 1.2 inclusive phenyl plus R'' radicals per silicon atom, with $y$ having a value of less than 0.15. It is preferred that the total number of organic radicals per silicon atom be from 0.95 to 1.2 inclusive $(z+y+z)$ and that at least 80 percent of the siloxane be $R''SiO_{1.5}$ and $(C_6H_5)SiO_{1.5}$. The best results are obtained when R' is vinyl, $y$ is about 0.005 and $(x+y+z)$ is from 0.98 to 1.05 inclusive. Conveniently, this composition is met when the siloxane is composed essentially of monophenylsiloxane units, $$R''SiO_{1.5}$$

units and monovinylsiloxane units in the ratio .895–0:0.1–.995:0.005, the sum equaling 1.0.

It is essential that siloxane (2) contain an average of at least two radicals per molecule which are either hydroxyl radicals or —OM radicals, wherein M is an alkali metal or quaternary ammonium or phosphonium radical. As in the case of siloxane (1), siloxane (2) can contain other reactive radicals, such as alkoxy radicals. However, it is preferred that all the reactive radicals be hydroxyl radicals.

It is to be understood that either of the two types of siloxanes employed herein can be homopolymeric, copolymeric, or mixtures of siloxanes, and further that all of the organic radicals attached to any one silicon atom can be the same or different. It is preferred that these siloxanes be either homopolymers or copolymers rather than mixtures.

From 40 to 175 parts by weight of organosilicon compound (2) can be used per 100 parts by weight of siloxane (1). It is preferred that from 50 to 160 parts by weight of (2) be used per 100 parts of (1). Still better results are obtained when 60 to 140 parts by weight of (2) are used, with the best results being obtained when 70 to 125 parts by weight of the siloxane are used per 100 parts of (1). The best results are obtained when from 70 to 125 parts of a hydroxyl-containing siloxane containing essentially only monophenylsiloxane units, mono-3,3,3-trifluoropropylsiloxane units and monovinylsiloxane units in the above said referred ratios are used per 100 parts of a hydroxy-endblocked dimethylpolysiloxane which has an average of from 300 to 3500 silicon atoms per molecule.

It is essential that a silicon-bonded hydroxyl condensation catalyst be used to catalyze the reaction between components (1) and (2) of this invention. When a component (2) which contains catalytic amounts of residual —OM radicals is used, it is not necessary to add any additional catalyst. In this case components (2) and (3) of the reaction mixture are one and the same. Examples of suitable —OM radicals are —OK, —ONa, —OLi, —OCs, and —ONR″₄, wherein R″ is an organic radical such as benzyl, ethyl, β-hydroxyethyl, methyl, β-phenylethyl, octadecyl and cyclohexyl. When (2) contains no —OM groups or an insufficient number to properly catalyze the condensation of (1) and (2), then a separate catalyst is employed.

The preferred silicon-bonded hydroxyl condensation catalysts are the alkali metal hydroxides, such as KOH, LiOH, NaOH, CsOH and RbOH. The preferred alkali metal hydroxides are KOH and NaOH. It is preferred to use potassium hydroxide in a sufficient amount to provide one potassium atom per 100 to 100,000 silicon atoms. The best results are obtained when there is one potassium atom per 500 to 10,000 silicon atoms. These preferred potassium to silicon ratios are also preferred when component (2) contains —OK radicals. The organosilicon salts of such alkali metal hydroxides can also be used. Suitable examples of such salts are $(CH_3)_3SiOK$, $(C_6H_5)(CH_3)_2SiOLi$,

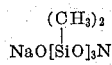

$(CH_3CH_2)_3SiONa$ and $(C_6H_5)_3SiOK$.

A further type of silicon-bonded hydroxyl condensation catalyst is found in the oxides of barium, strontium and calcium. Acids such as hydrochloric and sulfuric acids are also operative.

The phenoxide derivatives described in the copending application of Hyde and Schultz, Serial No. 191,738, filed May 2, 1962, entitled "Method of Polymerizing Hydroxylated Organosilicon Compounds" can be used as a catalyst in this invention. That application is hereby incorporated by reference. Specific examples of such phenoxide derivatives are potassium phenoxide,
sodium-p-phenoxidemethylphenoxide,
$CsOC_6H_4C_6H_5$,
$[(CH_3)_4NO]_2C_6H_2(CH_3)(CF_3)$,
$(C_4H_7)_3(C_6H_5)POC_6H_4C_6H_{11}$,
$ClC_6H_4OLi$,
$(RbO)_2C_6H_3ONa$, and
lithium phenoxide.

These compounds can be represented by the general formula

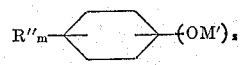

wherein R″ contains up to 10 carbon atoms and is either a monovalent hydrocarbon, halohydrocarbon or hydrocarbonoxy radical or a halogen atom, M′ is either an alkali metal, a tetra-alkyl- or tetraarylnitrogen radical, or a tetra-alkyl- or tetraarylphosphorus radical, the subscript $m$ has a value from 0 to 3 inclusive, $z$ has a value of from 1 to 3 inclusive and $m+z$ is an integer of from 1 to 4. The preferred alkali metal phenoxide is potassium phenoxide.

Another type of silicon-bonded hydroxyl condensation catalyst are the quaternary ammonium hydroxides and the organosilicon salts of such hydroxides. The organosilicon salts of quaternary ammonium hydroxides can be represented by the general formula

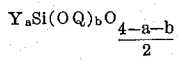

wherein Y is an alkali stable organic radical such as monovalent hydrocarbon radicals or fluorinated monovalent hydrocarbon radicals and Q is a quaternary ammonium ion, $a$ has an average value of from 1 to 3 inclusive, and $b$ has an average value of from .1 to 3 inclusive. Specific examples of such catalysts are β-hydroxyethyltrimethyl ammonium hydroxide,
benzyltrimethyl ammonium hydroxide,
didodecyldimethylammonium hydroxide,
$(CH_3)_3SiON(CH_3)_4$,
$(C_6H_5)(CH_3)_2SiON(CH_3)_3(CH_2CH_2OH)$,
the benzyltrimethyl ammonium salt of dimethylsilane diol,
octadecyltrimethyl ammonium hydroxide,
tetradodecyl ammonium hydroxide,
tritetradecylmethyl ammonium hydroxide, and
hexadecyloctadecyldimethyl ammonium hydroxide.

Primary, secondary and tertiary amines can be used as catalysts in this invention. It is preferred that these amines have a dissociation constant of at least $10^{-10}$. Examples of operative amines include the following:

brucine,
sec-butylamine,
cocaine,
diethylbenzylamine,
diethylamine,
diisoamylamine,
diisobutylamine,
dimethylamine,
dimethylaminomethylphenol,
dimethylbenzylamine,
dipropylamine,
ethylamine,
ethylenediamine,
hydrazine,
isoamylamine,
isobutylamine,
isopropylamine,
menthanediamine,
methylamine,
methyldiethylamine,
t-octylamine,
t-nonylamine,
piperidine,
n-propylamine,
t-octadecylamine,
quinine,
tetramethylenediamine,
triethylamine,
triisobutylamine,
trimethylamine,
trimethylenediamine,
tripropylamine,
L-arginine,
L-lysine,
aconitine,
benzylamine,
cinchonidine,
codeine,
coniine,
emetine,
o-methoxybenzylamine,
m-methoxybenzylamine,
p-methoxybenzylamine,
N,N-methoxybenzylamine,
o-methylbenzylamine,
m-methylbenzylamine,
p-methylbenzylamine,
N,N-methylbenzylamine,
morphine,
nicotine,
novocain base,
epsilonphenylamylamine,
delta-phenylbutylamine,
β-phenylethylamine,
β-phenylethylmethylamine,
gamma-phenylpropylamine,
N,N-isopropylbenzylamine,
physostigimine,
piperazine,
quinidine,
solamine,
sparetine,
tetramethylquanidine,
thebaine,
t-butyl-2,4-dinitrophenylamine,
t-butyl-2-hydroxy-5-nitrobenzylamine, t-butyl-4-isonitrosoamylamine,
t-octylamylamine,
t-octyl-2-(β-butoxyethoxy)ethylamine,
2,4,6-tris-(dimethylamino)phenol,
aniline,
phenylhydrazine,
pyridine,
quinoline,
p-bromophenylhydrazine,
n-nitro-o-toluidine,
β-ethoxyethylamine,
tetrahydrofurfurylamine,
m-aminoacetophenone,
iminodiacetonitrile,
putrescine,
spermin,
gamma-N,N-dimethylaminopropylpentamethyldisiloxane,
p-toluidine and
veratrine.

Also operative as catalysts are the condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, α,β-dimethylacrolein and amylamine, butyraldehyde and butylamine, acrolein and allylamine and formaldehyde and heptylamine.

Aromatic sulfonic acids, such as benzene sulfonic acid and p-toluene sulfonic acid, can be used as the catalyst in this invention. Sulfonic acid catalysts of the general formula $XSO_3H$ in which each X is either a perfluoroalkyl radical of less than 13 carbon atoms, a $H(CF_2)_c$— or a $F(CF_2)_cCFHCF_2$— where c has a value of less than 3 are operative. Examples of these catalysts are $CF_3SO_3H$, $C_2F_5SO_3H$, $C_4F_9SO_3H$, $C_8F_{17}SO_3H$, $HCF_2CF_2SO_3H$, $CF_2HSO_3H$ and $CF_3CFHCF_2SO_3H$.

Another type of silicon-bonded hydroxy condensation catalyst are the alkali metal alkylene glycol monoborates. Suitable examples of such compounds are:

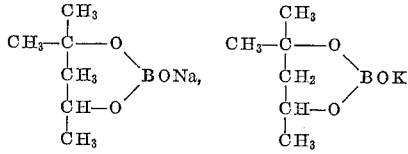

and

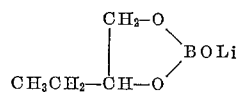

Another type of silicon-bonded hydroxyl condensation catalyst are the organic isocyanates which are free of active hydrogen and which have only one isocyanate group per molecule. These isocyanate catalysts are described in detail in U.S. Patent 3,032,530 (Falk). Specific examples of isocyanates which are operative herein are aliphatic isocyanates such as methyl isocyanate, butyl isocyanate, octadecyl isocyanate and hexenyl isocyanate; cycloaliphatic isocyanates such as cyclohexyl isocyanate and cyclohexenyl isocyanate; and aryl isocyanates such as xenyl isocyanate, bromophenyl isocyanate, anthracyl isocyanate, para-dimethyl aminophenyl isocyanate, and para-methoxyphenyl isocyanate.

Certain amine salts can also be used as catalyst in this invention. These amine salts are the reaction products of basic amino compounds, i.e., ammonium or organic amines (including silylorganic amines), with phosphoric or carboxylic acids. These amine salts are described in the copending application of Hyde, Serial No. 826,421, filed July 13, 1959, now U.S. Patent 3,160,601, entitled "Silanol Condensation Catalysts," which is hereby incorporated by reference. The term basic amino compound means compounds containing at least one nitrogen atom attached to no more than three carbon atoms. The basic amino compound can be a primary, secondary or tertiary amine, silylorganic amine, polyamine or ammonia. The amine can contain one or more amino groups and can contain functional organic groups which are free of active hydrogen. The preferred salts are the amino carboxylic acid salts which have at least six carbon atoms. Polycarboxylic acid salts can also be used. These amine salts can be normal, acidic or basic. Examples of such amine salts include: di-2-ethylhexylamine acetate, triphenylsilpropylamine formate, trimethylsilioxydimethylsilhexylamine hexoate, 4,4'-diaminobenzophenone butyrate, 4,4'-diaminodiphenylether decanoate, tri-n-butylamine acrylate, 3,4-dichloroaniline caproate, aniline octanoate, di-dodecylamine-o-chlorophenoxyacetate, ethylamine 3-ethoxypropionate, diethylene triamine monooleate, diisopropylamine palmitate, trimethylamine stearate, benzylhydrazine hexoate, 2,5-dimethylpiperazine octoate, tetramethylguanidine 2-ethylhexoate, di(octadecylamine)sebacate, ethylenediaminedihexoate, tetraethylenepentaamine diphosphate, 1,2-aminopropanephenylphosphate and ammonium stearate together with the salts of any other of the amines and acids shown above.

The catalysts disclosed in the Fianu U.S. Patent 2,902,468, entitled "Method of Polymerizing Hydroxylated Siloxanes," are operative as catalysts in this invention. This patent is hereby incorporated by reference. The catalysts disclosed in this patent are β-aminobutyric acids of the general formula

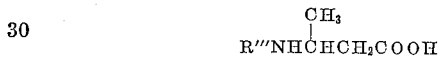

lactams of such acids of the formula

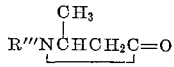

and α-amino acids of the formula

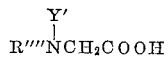

wherein R''' is a monovalent aliphatic hydrocarbon radical of from 5 to 30 inclusive carbon atoms, R'''' is an aliphatic hydrocarbon acyl group of from 5 to 30 inclusive carbon atoms and Y' is either methyl or hydrogen. Specific examples of such materials are N-caproyl glycine, N-caproyl sarcosine, N-palmityl sarcosine, N-oleyl glycine, N-benenyl glycine and N-linoleyl glycine.

The carboxylic acid salts of certain metals are operative as catalysts in this invention. Specific examples of the metals that can be used are lead, tin, nickel, cobalt, iron, cadmium, chromium, zinc, manganese, aluminum, magnesium, barium, strontium, calcium, cesium, rubidium, sodium and lithium. Specific examples of these salts are the naphthenates of the above metals such as lead naphthenate, cobalt naphthenate and zinc naphthenate; salts of fatty acids such as iron 2-ethylhexoate, stannous 2-ethylhexoate and chromium octoate; salts of aromatic carboxylic acids such as dibutyl tin dibenzoate; salts of polycarboxylic acids such as dibutyl tin adipate and lead sebacate; and salts of hydroxy carboxylic acids such as dibutyl tin dilactate.

The amount of catalyst required to affect the reaction is dependent upon a variety of factors, such as temperature and time of reaction, type of catalyst, nature of solvent and reactants used. Thus, no meaningful numerical limits can be set for the catalyst concentration. However, the optimum concentration for any particular system can be easily determined by heating a mixture of (1) and (2) in solution and observing the time required to give a peroxide vulcanizable product as described, infra. In general, the silicon-bonded hydroxyl condensation catalysts are used in the same concentration applicable to their use in effecting siloxane condensations in general.

The previously defined organosilicon compounds (1) and (2) are mixed and heated in a suitable solvent at a temperature sufficient to produce a peroxide vulcanizable product. The temperature and the time required for heating will depend upon the organosilicon compounds and catalyst used, nature of solvent and the concentration of the organosilicon compounds in the solvent. If the mixture is heated for too long a period of time, the vulcanized product flows excessively at 150° to 250° C. and its physical properties cannot be measured. If the mixture is not heated long enough, the resulting rubber has poor physical properties. It is preferred that this heating step be at the reflux temperature of the mixture for a time sufficient to produce a peroxide vulcanizable product. Generally, reflux times of from 0.1 to 20 hours are sufficient. Obviously no meaningful numerical limitations can be placed upon the heating time and temperature. The optimum time for any particular system can be determined by observing the time required to give a peroxide vulcanizable product. The time required will vary depending upon the organosilicon compounds and catalysts used, kind of solvent and the solid concentration. Although it is not essential to remove the by-products produced by this reaction during the heating step, it is preferred that a substantial portion of these by-products be removed during this step. These by-products can be removed as produced or can be removed near the end of the heating step. It is preferred that they be removed as they are produced.

Although it is preferred to add the entire amount of organosilicon compound (2) prior to heating, a small amount of this material can be added after the heating and catalyst deactivation steps but prior to the solvent removal step. However, it is essential that at least 40 parts by weight of organosilicon compound (2) per 100 parts of the siloxane (1) be added prior to the heating step. Although up to 135 parts by weight of organosilicon compound (2) can be added after the heating and catalyst deactivation steps, it is preferred that 80 parts or less be added.

Any inert solvent in which both siloxane (1) and organosilicon compound (2) are soluble at the temperature of the reaction can be used. The term "inert" means that the solvent does not react appreciably with the siloxanes or the catalysts. Organic ethers such as di-n-butyl-ether and ethylene glycol dimethylether are preferred as solvents. Another suitable solvent, which is also preferred, is a mixture of 6 parts by volume of toluene and one part by weight of dimethylformamide, the ratios of the two said solvents in the above said mixture are not critical except that there be enough of the polar solvent (dimethylformamide) to provide good solubility of the reactants. Other suitable solvents include esters such as butyl acetate and ketones such as acetone and methylisobutyl ketone. Generally, hydrocarbon solvents in conjunction with polar solvents wherein there is sufficient of the latter to provide good solubility of the reactants are very useful solvent mixtures for this system. It is preferred, but not necessary, that the solvent or solvent mixture be substantially immiscible with water. It should be pointed out that the reaction product should also be soluble in the solvent used in order to keep the product substantially homogeneous during the solvent removal.

The only limitation upon the concentration of organosilicon solids in the solvent is that there should be no appreciable gelation during the heating step. The maximum solids concentration permissible will vary depending upon the solvent, organosilicon compound and catalyst used. It is preferred that the solids concentration be less than 40 to 50 percent by weight based upon the total weight of the mixture. There is no lower limitation upon the solids concentration since gelation is not a problem in the lower concentration ranges. However, the efficiency of the system is decreased when the solid concentration is below 5 percent by weight.

Although not essential, better results are obtained when the catalyst is deactivated after the heating step. This is especially true when the rubber stock is to be stored for a long period of time prior to vulcanization, since the reaction will continue, resulting in poorer physical properties. The methods of deactivating catalysts are well known in the art and generally involve the removal and/or neutralization of the catalyst. It is preferred that at least a substantial portion of the catalyst be removed from the reaction product. When the alkali metal hydroxides are used it is preferred that the reaction product be carbonated after the completion of the heating step and then filtered or decanted from the precipitate. The best results are obtained if the reaction product is carbonated and filtered. Another method of deactivating the catalyst is by adding a fume silica to the reaction product, followed by decantation from the precipitate. Alternatively, the reaction product can be refluxed for a brief period of time prior to the decantation. It should be pointed out that although catalyst removal is preferred, it is not an essential step in this process. It is obvious that the method of catalyst deactivation will depend upon the particular catalyst used.

It is essential that the solvent be removed from the reaction product prior to the vulcanization of the rubber stock. There must be sufficient agitation during this step to keep the product substantially homogeneous during the solvent removal. One method of obtaining this result is by masticating the reaction product by hot milling the reaction product. Obviously the temperature and time of the milling step should be sufficient to remove substantially all of the solvent present. The conditions of milling, such as mill speed and pressure, must be sufficient to keep the product substantially homogeneous during this step. Although milling is the preferred manner of removing the solvent, other methods, such as removing the solvent while mixing, can be used as long as there is sufficient agitation to keep the product substantially homogeneous. It is preferred that the solvent removal step be at a temperature near the boiling point of the solvent.

In order to cure the rubber stocks of this invention there is admixed from 0.1 to 10 parts, preferably 0.5 to 5 parts, of an organic peroxide per 100 parts of rubber stock, and the mixture heated at a temperature above the decomposition point of the said peroxide. This is a conventional technique in the organosilicon elastomer field, and the technique for the present rubber stock is no different. The heating is normally carried out in a press, although, as is well known, certain peroxides allow cures in unconfined conditions. Steam or oil autoclaving can be employed. In short, conventional curing procedures for organosilicon rubber stocks are followed for this rubber stock. As is also true for conventional organosilicon elastomers, an after-cure at 150–250° C. for from 1 to 24 hours is also usually beneficial to producing improved physical properties of the present elastomers.

Examples of operative peroxides for vulcanizing the present rubber stocks include benzoyl peroxide, bis(dichlorobenzoyl)peroxide, di-t-butylperoxide, t-butyl-perbenzoate, dicumyl peroxide, t-butylperacetate and 2,5-dimethyl-2,5-di-t-butyl peroxyhexane.

Conventional fillers commonly employed in organosilicon rubber stocks can be added to the rubber stock of this invention. Illustrative of such fillers are such as fume silicas, silica hydrogels, aerogels and xerogels, crushed quartz, diatomaceous earth, calcium carbonate, zinc oxide, alumina, zirconium silicate, talc and magnesium silicate. Silica fillers having organosilyl units bonded to the substrate can also be used. When such fillers are present in the rubber stock of this invention, a small amount of cyanoguanidine or of urea can be used in addition to the peroxide vulcanizing agent. The use of cyanoguanidine as a vulcanizing agent is disclosed in copending application Serial No. 131,987, filed August 17, 1961, now U.S. Patent 3,086,954, and of urea in copending application Serial No. 254,451, filed January 28, 1963. While fillers such as the above are necessary in conventional silicone rubber stocks in order that the elastomers have any strength at all, they are not necessary in the present stocks, for the elastomers from these rubber stocks have good to excellent tensile strengths. Thus, the fillers (a) are optional, and (b) do not contribute substantially to the already good tensile properties of the elastomer of this invention. When it is desired that fillers such as the above be employed, it is preferred that they be employed in amounts substantially smaller than when the desired filler is employed in a conventional silicone rubber stock.

In addition to fillers, other additives can be used in the present rubber stock, such as compression set additives, thermal stabilizers, oxidation inhibitors, plasticizers, pigments, and other materials commonly employed in organosilicon rubbers.

The elastomers of this invention combine the unexpected high tensile strengths obtained without a filler, which produces an elastomer having excellent fatigue resistance and snappiness, with improved resistance to swelling in organic hydrocarbon fluids. This combination is obtained at a further advantage in that the soluble fraction of the elastomer is substantially reduced in the composition of this invention.

The following examples are illustrative only and should not be construed as limiting the invention which is properly delineated in the appended claims.

Example 1

This example illustrates the preparation of a co-resin and of the polymer of this invention.

A mixture of 57.6 g. (0.249 mol) of 3,3,3-trifluoropropyltrichlorosilane, 158.4 g. (0.749 mol) of phenyltrichlorosilane and 0.404 g. (0.0025 mol) of vinyltrichlorosilane was added to a mixture of 3.5 pounds (about 2,000 ml.) of diethylether, 1,000 ml. of water and 255.0 g. of sodium bicarbonate, over a period of about 2½ hours at ambient temperature (less than 35° C., the boiling point of diethylether) with rapid stirring throughout the entire operation. The mix was allowed to separate overnight at room temperature. After separation of the water and washing of the ether solution to complete the removal of inorganic chlorides, the ether was removed, by evaporation at room temperature, to a constant weight of product. High vacuum was employed at the later stages of evaporation to facilitate final removal of the ether.

The product, 116.8 g. (87.2% yield), was a white friable solid, having a melting range of 89 to 94° C.

A solution of 25 g. (0.337 mol of siloxane) of a hydroxyl-endblocked dimethylpolysiloxane of 13,000 cs. viscosity (measured at 25° C.; this corresponds to an average degree of polymerization of 565) and 25 g. of the product from above (0.1865 mol of silicon in the resin) in 582 ml. (450 g.) of di-n-butylether was heated to reflux with azeotrope for one hour. The catalyst, 5.23 ml. of 0.05 N alcoholic potassium hydroxide (corresponds to 1K atom/2,000 silicon atoms), was added shortly before the solution began to reflux. The cooled solution was saturated with carbon dioxide by the addition of several grams of Dry Ice, after which the solution was filtered through a commercial filter aid. The product was recovered from solution by devolatilization on a hot two-roll rubber mill. The dried composition was a milk-white viscous fluid. One part of t-butylperbenzoate per 100 parts of the said copolymer was milled into the composition. A slab of rubber was made therefrom by press-molding for 10 minutes at 150° C. high pressure. The test slab was heated one hour at 150° C. in an air-circulating oven, after which different portions were cured, each 1, 3 and 7 days at 250° C., in an air-circulating oven. Tensile properties were determined on the three samples and appear in Table I below. A portion of the sample heated three days at 250° C. was immersed 24 hours at room temperature in toluene, after which the volume swell and weight gain were determined. The swollen sample was then dried by thorough removal of toluene, and the weight of the dry sample was determined. From these determinations the percent swell (percent $S_v$), swelled weight-to-dried extracted weight ratio ($S_w$) and percent extracted (percent Ext.) were determined, and are also shown below.

TABLE I

| Cure, days at 250° C. | Hardness Shore A | Tensile, p.s.i. | Elongation, percent | Percent $S_v$ | $S_w$ | Percent Ext. |
|---|---|---|---|---|---|---|
| 1 | 36 | 660 | 440 | | | |
| 3 | 49 | 543 | 189 | 366 | 4.49 | 12.1 |
| 7 | 60 | 271 | 76 | | | |

Example 2

This example illustrates the decreased percent of extractable material in the elastomers made in the copolymer of this invention. Co-resins were prepared following the procedure of Example 1, having the following compositions:

| Sample No. | Resin Composition, mol percent | | |
|---|---|---|---|
| | $C_6H_5SiO_{1.5}$ | $CF_3CH_2CH_2SiO_{1.5}$ | $C_2H_3SiO_{1.5}$ |
| 1 | 100 | | |
| 2 | 89.01 | 10.38 | .61 |
| 3 | 74.88 | 24.88 | .25 |
| 4 | 49.88 | 49.88 | .25 |
| 5 | 24.88 | 74.88 | .25 |
| 6 | | 99.0 | 1.0 |

Copolymers were made from each of the resins above as per Example 1, using equal weights of the hydroxyl-endblocked dimethylpolysiloxane of that example and of the resins listed above. Each of the six samples was vulcanized as in Example 1, then cured one hour at 150° C. and 3 days at 250° C. in an air-circulating oven. Portions of each were immersed 24 hours in toluene at room temperature. Percent volume swell (percent $S_v$), swollen weight-to-dry extracted weight ratio ($S_w$) and percent extracted (percent Ext.) were determined for each sample and are shown in Table II below.

TABLE II

| Sample No. | Mol percent $CF_3CH_2CH_2SiO_{1.5}$, Resin portion | Percent $S_v$ | $S_w$ | Percent Ext. |
|---|---|---|---|---|
| 1 | 0 | *494 | *6.5 | *28.0 |
| 2 | 10.4 | 406 | 5.21 | 21.3 |
| 3 | 24.9 | 366 | 4.49 | 12.1 |
| 4 | 49.9 | 224 | 2.92 | 7.7 |
| 5 | 74.9 | 244 | 3.00 | 3.6 |
| 6 | 99.0 | 82 | 1.69 | 0.52 |

*These are average figures.

These data clearly show the beneficial effect of increased $CF_3CH_2CH_2SiO_{1.5}$ content in the resin portion of the copolymer on swelling resistance of the elastomer. This is shown by the change in percent $S_v$ with change in $CF_3CH_2CH_2SiO_{1.5}$ content of the elastomers. The unexpected and quite pronounced reduction in percent extractables (percent Ext.) is also quite evident.

Example 3

Equivalent results are obtained when the following hydroxylated resins are employed in place of the resin of Example 1 to make elastomers as per that example.

A. 40 parts of a resin comprised essentially of 74.9 mol percent of $C_3F_7CH_2CH_2SiO_{1.5}$ units, 20 mol percent of $C_6H_5SiO_{1.5}$ units, 5 mol percent of $C_{18}H_{37}SiO_{1.5}$ units, and 0.1 mol percent of $SiO_2$ units.

B. 165 parts of a resin comprised essentially of 60 mol percent of $C_{10}F_{21}CH_2CH_2SiO_{1.5}$ units, 30 mol percent of $(CF_3)_2CHCH_2(CH_3)SiO$ units and 10 mol percent of $C_3H_7SiO_{1.5}$ units.

C. 120 parts of a resin comprised essentially of 15 mol percent of $C_4F_9CH_2CH_2SiO_{1.5}$ units, 45 mol percent of $C_6H_5SiO_{1.5}$ units, 15 mol percent of xenylchlorohexylsiloxane units, 5 mol percent of methallysiloxane units and 20 mol percent of $SiO_2$ units.

D. 75 parts of a resin comprised essentially of 60 mol percent of $C_4F_9CH_2CH_2SiO_{1.5}$ units, 30 mol percent of $C_4F_9CH_2CH_2(CH_3)SiO$ units, 5 mol percent of $SiO_2$ units and 5 mol percent of $C_2H_3SiO_{1.5}$ units.

E. 130 parts of a mixture of 2 resins, the first of which is of the unit formula $CF_3CH_2CH_2SiO_{1.5}$, and which contains a plurality of silicon-bonded hydroxyl radicals, the other of which is comprised essentially of 45 mol percent of $C_6H_5SiO_{1.5}$ units, 25 mol percent of $CF_3CH_2CH_2SiO_{1.5}$ units, 20 mol percent of cyclopentylsiloxane units, 5 mol percent of butyldienylsiloxane units and 5 mol percent of $SiO_2$ units, the said mixture being 5 parts by weight of the first resin to one part by weight of the other resin.

Example 4

Equivalent results are obtained when any of the following essentially diorganosiloxane polymers are used in place of the dimethylpolysiloxane of Example 1.

A. A hydroxyl-endblocked copolymer containing 10 mol percent of phenylmethylsiloxane units, 15 mol percent of divinylsiloxane units, one mol percent of vinylmethylsiloxane units and 74 mol percent of dimethylsiloxane units, having an average degree of polymerization of 3500.

B. A hydroxyl-endblocked copolymer containing 49.5 mol percent of diphenylsiloxane units, 0.5 mol percent of phenylvinylsiloxane units and 50 mol percent of dimethylsiloxane units, having an average degree of polymerization of 1,000.

C. A hydroxyl-endblocked phenylmethylsiloxane polymer having an average degree of polymerization of 250.

D. A mixture of 10 parts by weight of polymer C above and 90 parts by weight of copolymer B above.

Example 5

When any of the catalysts listed below are substituted in the amounts shown for the alcoholic potassium hydroxide of Example 1, good peroxide vulcanizable silicone stocks result when the reaction is conducted for a sufficient time.

| Catalyst | Amount |
|---|---|
| Potassium hexylene glycol monoborate. | 1 K/3600 Si. |
| Potassium phenoxide | 1 K/500 Si. |
| Tetramethylguanidine-di-2-ethylhexoate. | 0.2% by weight based on total wt. of siloxanes. |
| Sodium hydroxide | 1 Na/20,000 Si. |
| $CH_3(C_6H_5)_2SiOLi$ | 1 Li/1500 Si. |
| n-Hexylamine | 2% by weight based on total wt. of siloxanes. |
| p-Toluenesulfonic acid | 0.75% by wt. based on the total wt. of siloxanes. |
| Stannous octoate | 0.012% by wt. based on the total wt. of siloxanes. |
| $(CH_3)_4NOH$ | 1 N/1,000 Si. |
| $(C_4H_9)_4POH$ | 1 P/5500 Si. |
| $HCF_2CF_2SO_3H$ | 0.1% by wt. based on the total wt. of siloxanes. |
| $\underset{\underset{C_6H_{13}NHCHCH_2COOH}{\|}}{CH_3}$ | 0.5% by wt. based on the total wt. of siloxanes. |

Example 6

A good silicone rubber stock results when 100 parts by weight of a siloxane containing 50 mol percent of $C_4F_9CH_2CH_2SiO_{1.5}$ units, 20 mol percent of $C_6H_5SiO_{1.5}$ units, 10 mol percent of $CF_3CH_2CH_2(CH_3)SiO$ units and 20 mol percent of $SiO_2$ units, containing pendant —ONa radicals in the ratio of one Na per 1,000 silicone atoms of the said siloxane, and 100 parts by weight of a hydroxylated essentially diorganopolysiloxane containing 75 mol percent of dimethylsiloxane units, 20 mol percent of phenylmethylsiloxane units, 4.9 mol percent of methylvinylsiloxane units, 0.08 mol percent of monomethylsiloxane units and 0.02 mol percent of $SiO_2$ units are reacted as in Example 1.

That which is claimed is:

1. A block copolymer consisting essentially of
(D) blocks of the formula $$\left[ R_nSiO_{\frac{4-n}{2}} \right]_w$$

wherein $w$ has an average value of at least 200, R is selected from the group consisting of methyl, phenyl and vinyl radicals, $n$ has an average value of from 1.98 to 2.00 inclusive, there being an average of at least 0.75 methyl radicals per silicon atom and an average of no more than 0.15 vinyl radicals per silicon atom in said blocks (D), no more than 50 mol percent of said blocks (D) being $(C_6H_5)_2SiO$ units, coupled to
(E) blocks of the formula $$\left[ (C_6H_5)_xR'_yR''_zSiO_{\frac{4-x-y-z}{2}} \right]_m$$

wherein $m$ is an integer, R' is a monovalent hydrocarbon radical, R'' is a β-(perfluoroalkyl)ethyl radical, $z$ has an average value of from 0.1 to 1.3 inclusive, $x$ has a maximum average value of 1.2, $x+z$ has an average value of from 0.65 to 1.3 inclusive, $y$ has an average value of less than 0.4, $x+y+z$ has an average value of from 0.85 to 1.3, at least 10 mol percent of said blocks (E) being $R''SiO_{1.5}$ units, at least 60 mol percent of said blocks (E) being the sum of $R''SiO_{1.5}$ and $(C_6H_5)SiO_{1.5}$ units, there being present from 40 to 175 parts by weight of blocks (E) per 100 parts by weight of blocks (D).

2. The block copolymer of claim 1 wherein blocks (D) are of the formula $$\left[ (CH_3)_nSiO_{\frac{4-n}{2}} \right]_w$$

and blocks (E) are of the formula $$\left[ (C_6H_5)_x(CH_2=CH)_y(CF_3CH_2CH_2)_z-SiO_{\frac{4-x-y-z}{2}} \right]_m$$

3. The block copolymer of claim 2 wherein the sum of $x+y$ has an average value of 0.8 to 1.2 inclusive, $y$ has an average value of less than 0.15, the sum of $x+y+z$ is from 0.95 to 1.2 inclusive, with at least 80 mol percent of the blocks (E) being the sum of $R''SiO_{1.5}$ and $(C_6H_5)SiO_{1.5}$ units.

4. The block copolymer of claim 3 wherein $z$ is at least 0.25.

5. The block copolymer of claim 1 wherein the sum of $x+y$ has an average value of 0.9 to 1.2 inclusive, $y$ has an average value of less than 0.15, the sum of $x+y+z$ has an average value of 0.95 to 1.2 inclusive, with at least 80 mol percent of blocks (E) being the sum of $(C_6H_5)SiO_{1.5}$ and $R''SiO_{1.5}$, there being present from 50 to 160 parts by weight of blocks (E) per 100 parts by weight of blocks (D).

6. The block copolymer of claim 5 wherein R is methyl, R' is vinyl and R'' is $CF_3CH_2CH_2-$.

7. The block copolymer of claim 6 wherein $z$ is at least 0.25.

(References on following page)

References Cited by the Examiner

UNITED STATES PATENTS

| | | | |
|---|---|---|---|
| 2,736,720 | 2/1956 | Kidwell | 260—46.5 |
| 2,878,195 | 3/1959 | Hurd | 260—46.5 |
| 2,902,468 | 9/1959 | Fianu | 260—46.5 |
| 3,032,531 | 5/1962 | Saylor | 260—46.5 |
| 3,037,962 | 6/1962 | Hartung et al. | 260—46.5 |
| 3,061,594 | 10/1962 | Kuckro | 260—46.5 |
| 3,094,497 | 6/1963 | Hyde | 260—46.5 |
| 3,122,516 | 2/1964 | Polmanteer | 260—37 |
| 3,127,433 | 3/1964 | Tarrant | 260—37 |
| 3,153,007 | 10/1964 | Boot | 260—46.5 |
| 3,156,668 | 11/1964 | Pike | 260—46.5 |
| 3,169,942 | 2/1965 | Pike | 260—46.5 |
| 3,179,619 | 4/1965 | Brown | 260—37 |
| 3,186,967 | 6/1965 | Nitzsche et al. | 260—46.5 |

FOREIGN PATENTS

| | | |
|---|---|---|
| 828,833 | 2/1960 | Great Britain. |
| 891,199 | 3/1962 | Great Britain. |

LEON J. BERCOVITZ, *Primary Examiner.*

WILLIAM H. SHORT, *Examiner.*

M. I. MARQUIS, *Assistant Examiner.*